United States Patent [19]
Takayanagi et al.

[11] Patent Number: 5,653,387
[45] Date of Patent: Aug. 5, 1997

[54] HEATING APPARATUS WITH A BURNER AND HEAT EXCHANGER COUPLED TO EACH OTHER

[75] Inventors: Minoru Takayanagi, Nitta-gun; Fujio Uchiumi, Kiryu; Tomoyuki Iiyama, Isesaki, all of Japan

[73] Assignee: Sanden Corporation, Gunma, Japan

[21] Appl. No.: 496,108

[22] Filed: Jun. 28, 1995

[30] Foreign Application Priority Data

Jun. 29, 1994 [JP] Japan .................... 6-148175

[51] Int. Cl.$^6$ .................... B60H 1/22
[52] U.S. Cl. .................... 237/12.3 C
[58] Field of Search .................... 237/12.3 C

[56] References Cited

U.S. PATENT DOCUMENTS

| | | | |
|---|---|---|---|
| 4,519,772 | 5/1985 | Mittmann | 237/12.3 C X |
| 4,590,888 | 5/1986 | Mosig | 237/12.3 C |
| 4,688,718 | 8/1987 | Galtz et al. | 237/12.3 C |
| 4,718,602 | 1/1988 | Beck et al. | 237/12.3 C |
| 4,976,463 | 12/1990 | Soo | 237/12.3 C X |
| 5,249,956 | 10/1993 | Chu | 237/12.3 C X |
| 5,456,408 | 10/1995 | Appel | 237/12.3 C X |

FOREIGN PATENT DOCUMENTS

7-103413  4/1995  Japan .

Primary Examiner—William E. Tapoical
Attorney, Agent, or Firm—Banner & Witcoff, Ltd.

[57] ABSTRACT

The present invention is directed to a heating apparatus having a burner and a heat exchanger coupled to each other. The burner includes a single piece integral cylindrical casing in which a burning mechanism, a motor fan and a fuel supply pipe are contained. A first cylindrical member is disposed within the cylindrical burner casing, and couples the burning mechanism, the motor fan and the fuel supply pipe to one another. The heat exchanger is formed by double cup-shaped members, and defines a first path for a heat medium and a second path for combustion gas of the burner. The heat exchanger is provided with a heat medium inlet port linked to the first path, a heat medium outlet port also linked to the first path, and a combustion gas outlet port linked to the second path. A second cylindrical member surrounds the burning mechanism and is releasably secured to the first cylindrical member at one of its axial ends. The other axial end of the second cylindrical member is in fitting contact with one axial end portion of a third cylindrical member which is disposed within the heat exchanger. One axial end of the third cylindrical member is connected to one end of the heat exchanger. One end of the heat exchanger is releasably secured to one end of the single integral cylindrical casing.

37 Claims, 6 Drawing Sheets

HEATING APPARATUS WITH A BURNER AND HEAT EXCHANGER COUPLED TO EACH OTHER

BACKGROUND OF THE INVENTION

1. Field of the Invention

The present invention relates to a heating apparatus, and more particularly, to a heating apparatus having a burner and a heat exchanger which are coupled to each other.

2. Description of the Prior Art

Heating apparatuses which have a burner and a heat exchanger coupled to each other are well known in the art. For example, Japanese Patent Application Publication No. 7-103413 discloses such a conventional heating apparatus.

Figure 1:
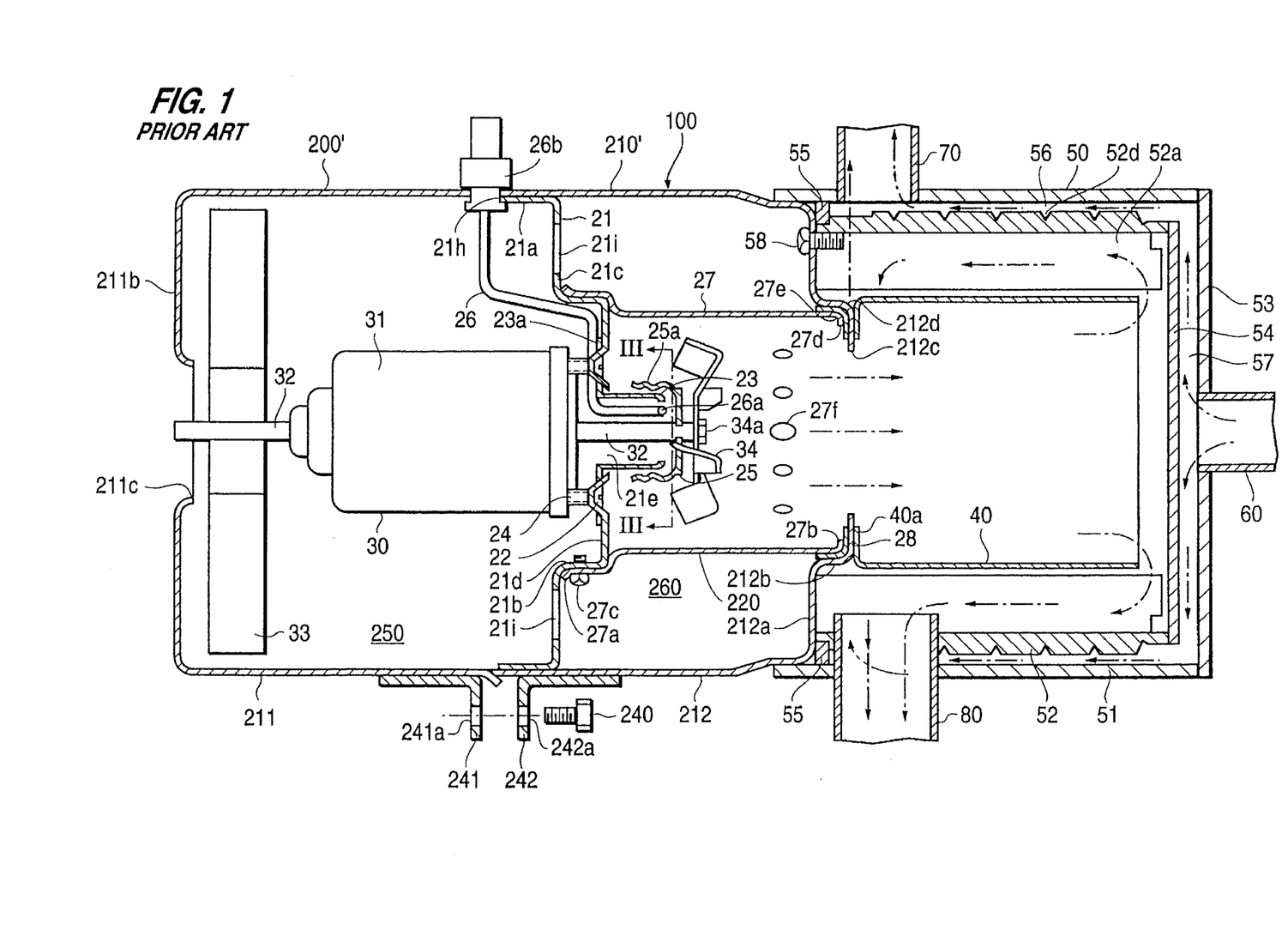
FIG. 1 is a longitudinal cross sectional view of a prior art heating apparatus.

FIG. 1 illustrates the above-mentioned conventional heating apparatus 100. In FIG. 1, for purposes of explanation only, the left side of the figure will be referenced as the forward end or front of heating apparatus 100, and the right side of the figure will be referenced as the rearward end or rear of heating apparatus 100.

With reference to FIG. 1, the conventional heating apparatus 100 includes a burner 200' and heat exchanger 50. Burner 200' comprises a burning mechanism 220, a fan motor 30 associated with the burning mechanism 220, and cylindrical casing 210' housing the burning mechanism 220 and the fan motor 30 therein. Cylindrical casing 210' comprises a separate first casing portion 211 and second casing portion 212 to the rear of first casing portion 211. First and second casing portions 211 and 212 respectively house fan motor 30 and burning mechanism 220.

First and second casing portions 211 and 212 are joined to each other at their rear end and front ends, respectively, in a fashion of faucet joint. Casing portions 211 and 212 are firmly and releasably connected to each other by, for example, a plurality of screws 240 through a corresponding pair of L-shaped plates 241 and 242 which respectively are fixedly connected to a rear end region of first casing portion 211 and a front end region of second casing portion 212. When the first and second casing portions 211 and 212 are connected to each other, they are arranged such that their longitudinal axes are aligned with each other. Furthermore, circular openings 241a and 242a having female screw threads are formed in L-shaped plates 241 and 242 for receiving a shaft portion of screws 240 having a male screw thread.

Figure 2:
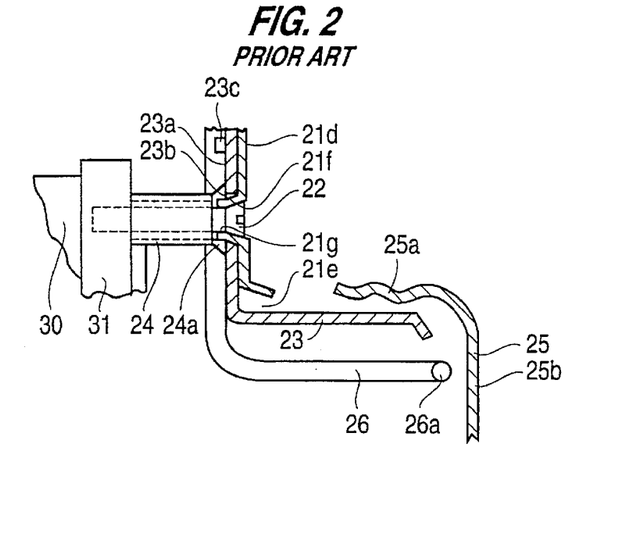
FIG. 2 is an enlarged partial cross sectional view of a burning mechanism of a burner shown in FIG. 1.

First cylindrical member 21 is disposed in a front section of an inner hollow space of second casing portion 212. First cylindrical member 21 comprises a large diameter region 21a, a small diameter region 21b to the rear of large diameter region 21a, first annular planar region 21c which connects large diameter region 21a to small diameter region 21b, and second annular planar region 21d which extends radially inwardly from an inner periphery of a rear end of small diameter region 21b. An inner terminal end of second annular planar region 21d is located at a position which is about one-third of a diameter of small diameter region 21b, so that circular opening 21e is centrally defined within second annular planar region 21d of first cylindrical member 21. An outer diameter of large diameter region 21a is designed to be about equal to an inner diameter of second casing portion 212. First and second annular planar regions 21c and 21d are arranged to be parallel to a plane perpendicular to the longitudinal axis of first cylindrical member 21. As illustrated in FIG. 2, a plurality of indents 21f are formed at second annular planar region 21d of first cylindrical member 21 so as to receive a head portion of the corresponding later-mentioned flush screws 22.

Second cylindrical member 23 is disposed within the circular opening 21e of first cylindrical member 21. Second cylindrical member 23 includes a flange portion 23a which extends radially outwardly from a periphery of a front end of second cylindrical member 23. As illustrated in FIG. 2, a front end section of indents 21f are received in the corresponding circular holes 23b which are formed at the flange portion 23a of second cylindrical member 23, so that flange portion 23a of second cylindrical member 23 is disposed on a front end surface of second annular planar region 21d of first cylindrical member 21.

With reference to FIG. 2 in addition to FIG. 1, fan motor 30 is disposed within first casing portion 211 at a position which is in front of first cylindrical member 21. Fan motor 30 is fixedly secured to second annular planar region 21d of first cylindrical member 21 at its rear end by, for example, a plurality of flush screws 22. A shaft portion of flush screw 22 penetrates through a hole 21g which is formed at a bottom end of indent 21f, and the head portion of flush screw 22 is received within indent 21f. The shaft portion of flush screws 22 further penetrate through the corresponding collars 24 which are disposed between a housing 31 of fan motor 30 and the flange portion 23a of second cylindrical member 23. Each collar 24 includes a truncated cone portion 24a formed at its rear end. The truncated cone portion 24a of each collar 24 faces a rear end surface of the flange portion 23a of second cylindrical member 23.

A front end section of the shaft portion of each flush screw 22 is screwed into the housing 31 of fan motor 30, so that each collar 24 is firmly disposed between the housing 31 of fan motor 30 and the flange portion 23a of second cylindrical member 23. As a result, fan motor 30 is firmly secured to the second annular planar region 21d of first cylindrical member 21 through collars 24 and flange portion 23a of second cylindrical member 23.

Front and rear ends of drive shaft 32 of fan motor 30 respectively extend forwardly and rearwardly from the housing 31 of fan motor 30. First fan 33 is firmly secured to a front end portion of drive shaft 32 by means of an appropriate securing manner, so that first fan 33 rotates together with the drive shaft 32 during operation of the heating apparatus 100. Second fan 34 is firmly secured to the rear end of drive shaft 31 by, for example, bolt 34a, so that second fan 34 also rotates together with the drive shaft 32 during operation of the heating apparatus 100.

Cup-shaped member 25 is firmly mounted about the rear end portion of drive shaft 32 at a position between the second fan 34 and a rear end of the second cylindrical member 23. Accordingly, cup-shaped member 25 rotates together with the drive shaft 32 during operation of the heating apparatus 100. An annular side wall 25a of cup-shaped member 25 surrounds a rear end portion of second cylindrical member 23 with creating a radial air gap therebetween. Furthermore, cup-shaped member 25 is slightly broadened forwardly.

Fuel supply pipe 26 is disposed within casing 210', and is arranged to generally extend along first and second cylindrical members 21 and 23. As illustrated in FIG. 2, one end of fuel supply pipe 26 slightly projects from the rear end of second cylindrical member 23, but is located at a position forward of a bottom end 25b of cup-shaped member 25. The one end of fuel supply pipe 26 is bent in generally a right angle to form an nozzle 26a. Nozzle 26a of fuel supply pipe 26 is arranged to be situated in a zone which is defined below.

Figure 3:
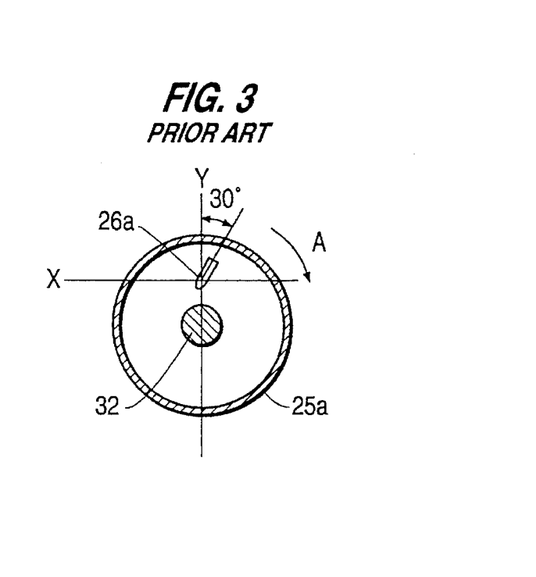
FIG. 3 is an enlarged cross sectional view taken on line III—III of FIG. 1.

With reference to FIG. 3, on a plane perpendicular to the longitudinal axis of drive shaft 32 of fan motor 30, axes "Y" and "X" are defined as follows. Axis "Y" is located on a first line which connects the longitudinal axis of drive shaft 32 of fan motor 30 and a center of a base of nozzle 26a. Axis "X" is located on a second line which intersects with axis "Y" at the center of the base of nozzle 26a at a right angle. Upon a definition of axes "X" and "Y", nozzle 26a is arranged such that the longitudinal axis of nozzle 26a is situated in a first quadrant of axes "X" and "Y" while the rotational direction of drive shaft 32 of fan motor 30 is clockwise as indicated by arrow "A". Preferably, nozzle 26a is arranged, such that an angle created between the longitudinal axis of nozzle 26a and axis "Y" is 30°.

Figure 4:
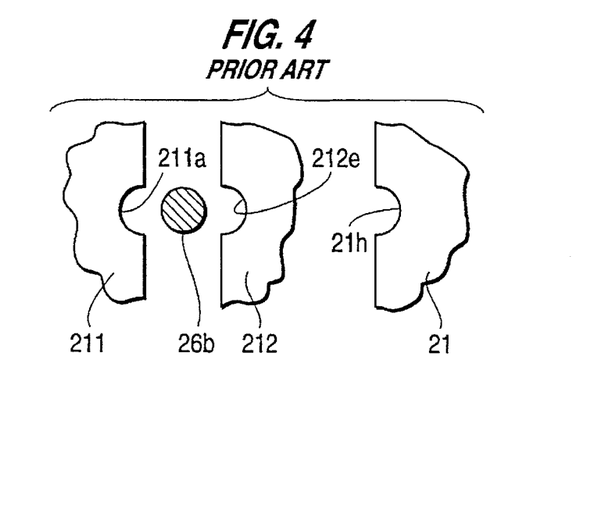
FIG. 4 is an exploded partial top plan view of the heating apparatus shown in FIG. 1.

Fuel supply pipe 26 is radially spaced from drive shaft 32 of fan motor 30 and the side wall 25a of cup-shaped member 25 so that interference between the fuel supply pipe 26, and the drive shaft 32 of fan motor 30 and the cup-shaped member 25 is prevented during rotation of the drive shaft 32 of fan motor 30. As illustrated in FIG. 2, fuel supply pipe 26 is secured to a front end surface of flange portion 23a of second cylindrical member 23 by, for example, caulking, so that caulked portion 23c is formed at the front end surface of flange portion 23a. The other end of fuel supply pipe 26 is fixedly connected to coupling element 26b which is used for connecting the fuel supply pipe 26 to an external fuel supply pipe (not shown) which is connected to a fuel tank (not shown). As illustrated in FIG. 4, the coupling element 26b is received in semicircular opening 211a formed at a rear end of first casing portion 211 and semicircular opening 212e formed at a front end of second casing portion 212, so that coupling element 26a is secured to casing 210.

Third cylindrical member 27 includes a large diameter section 27a formed at a front end thereof and a flange section 27b formed at a rear end thereof. The large diameter section 27a of third cylindrical member 27 is disposed on an outer surface of the small diameter region 21b of first cylindrical member 21. The large diameter section 27a of third cylindrical member 27 and the small diameter region 21b of first cylindrical member 21 are firmly and releasably attached to each other by, for example, a plurality of screws 27c. Accordingly, first cylindrical member 21 and third cylindrical member 27 are firmly and releasably secured to each other. The flange section 27b extends radially inwardly from a periphery of a rear end of third cylindrical member 27, so that circular opening 27d is defined within flange section 27b. The flange section 27b is arranged to be parallel to a plane perpendicular to the longitudinal axis of third cylindrical member 27.

Thus, the burning mechanism 220 is substantially constructed by first through third cylindrical members 21, 23 and 27, cup-shaped member 25, second fan 34, and fuel supply pipe 26.

The second casing portion 212 includes a rear end plate section 212a formed at a rear end thereof. The rear end plate section 212a is arranged to be parallel to a plane perpendicular to the longitudinal axis of second casing portion 212. The rear end plate section 212a includes a cylindrical region 212b with a diameter designed to be slightly greater than that of third cylindrical member 27. Cylindrical region 212b is arranged, such that a longitudinal axis thereof is located on the longitudinal axis of second casing portion 212. Circular opening 212c with a diameter slightly smaller than that of the opening 27d of third cylindrical member 27 is centrally formed at the rear end plate section 212a. Furthermore, a part of second casing portion 212 adjacent to the rear end plate section 212a is gradually narrowed.

Annular member 28 having a L-shaped cross section is fittingly disposed on an outer surface of a corner 27e which is formed at a time when the flange section 27b is formed. Annular member 28 and third cylindrical member 27 are fixedly attached to each other at their mating surfaces by, for example, spot welding. An inner diameter of annular member 28 is designed to be slightly smaller than that of the circular opening 27d of third cylindrical member 27, but to be slightly greater than that of the circular opening 212c of second casing portion 212.

Annular member 28 is also fittingly disposed on an inner surface of a corner 212d which is formed at a time when the cylindrical region 212b is formed. Accordingly, third cylindrical member 27 is fittingly disposed on the inner surface of the corner 212d of second casing portion 212 through annular member 28.

Fourth cylindrical member 40 is located at a position which is to the rear of third cylindrical member 27. Fourth cylindrical member 40 includes a flange 40a which is formed by bending a front end portion of fourth cylindrical member 40 radially inwardly at right angle. A diameter of fourth cylindrical member 40 is designed to be about equal to that of the cylindrical region 212b of second casing portion 212. An inner diameter of flange 40a of fourth cylindrical member 40 is designed to be slightly greater than that of circular opening 212c of the rear end plate section 212a of second casing portion 212. The flange 40a of fourth cylindrical member 40 is disposed on a rear end surface of the rear end plate section 212a of second casing portion 212. Fourth cylindrical member 40 and second casing portion 212 are fixedly attached to each other at their mating surfaces by, for example, spot welding. When fourth cylindrical member 40 is fixedly attached to second casing portion 212, fourth cylindrical member 40 is arranged such that the longitudinal axis thereof is located on the longitudinal axis of second casing portion 212.

First casing portion 211 includes a front end plate section 211b formed at a front end thereof. The front end plate section 211b is located at a position adjacent to first fan 33 so as to cover first fan 33. Accordingly, an interference between the first fan 33 and objects from outside of the heating apparatus 100 is effectively prevented. Circular opening 211c is centrally formed in the front end plate section 211b of first casing portion 211 so as to provide communication between the outside and the inside of casing 210'.

Figure 7:
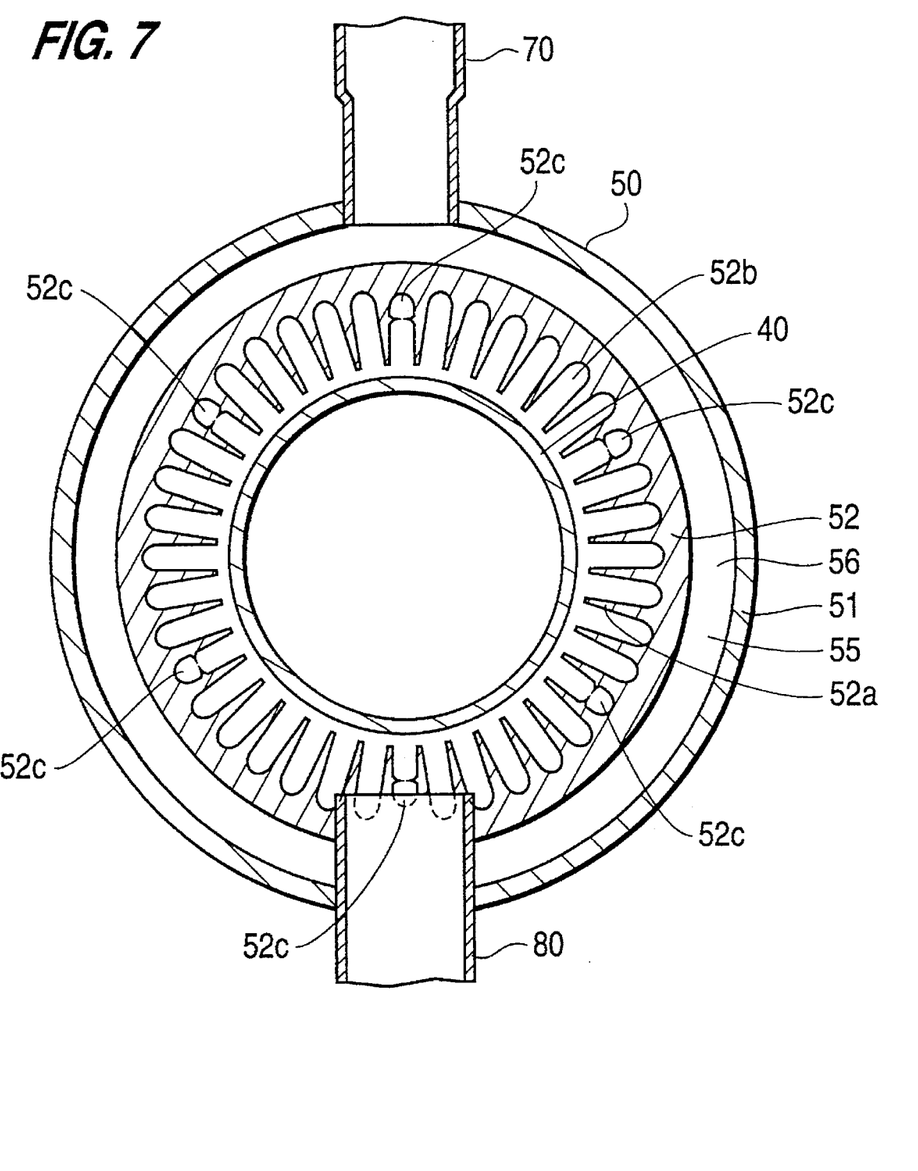
FIG. 7 is an enlarged cross sectional view taken on line VII—VII of FIG. 5.

Heat exchanger 50 includes an outer annular cylindrical member 51 and an inner annular cylindrical member 52 spaced radially inward from the outer annular cylindrical member 51. An outer diameter of the inner annular cylindrical member 52 is designed to be smaller than an inner diameter of the outer annular cylindrical member 51. An axial length of the inner annular cylindrical member 52 is designed to be slightly smaller than that of the outer annular cylindrical member 51. First circular plate member 53 is fixedly disposed at a rear end of the outer annular cylindrical member 51. Second circular plate member 54 is fixedly disposed at a rear end of the inner annular cylindrical member 52. The inner annular cylindrical member 52 includes a plurality of projections 52a which project radially inwardly from an inner peripheral surface of inner annular cylindrical member 52 as illustrated in FIG. 7. A plurality of axial passages 52b are defined between the adjacent projections 52a.

Heat exchanger 50 further includes an annular plate member 55 which bridges between a front end portion of the outer annular cylindrical member 51 and a front end of the inner annular cylindrical member 52. An inner peripheral portion of the annular plate member 55 is fixedly received on a front outer surface of the inner annular cylindrical member 52, and an outer peripheral portion of the annular plate member 55 is fixedly received on an inner surface of the front end portion of the outer annular cylindrical member 51. Thus, annular hollow space 56 is defined by the outer and inner annular cylindrical members 51 and 52 and the annular plate member 55. Furthermore, when annular plate member 55 fixedly bridges between the outer and inner annular cylindrical members 51 and 52, cylindrical hollow space 57 is defined between the first and second circular plate members 53 and 54.

The inner annular cylindrical member 52 of heat exchanger 50 is firmly and releasably secured to the rear end plate section 212a of second casing portion 212 by, for example, a plurality of screws 58. In this securing manner, a shaft portion of screws 58 are engaged with the corresponding female screw portions 52c, which are formed at an inner peripheral surface of the inner annular circular member 52 as illustrated in FIG. 7. When the inner annular cylindrical member 52 is secured to the second casing portion 212, fourth cylindrical member 40 is disposed within an inner hollow space of the inner annular cylindrical member 52 of heat exchanger 50.

Heat exchanger 50 is provided with a heat medium inlet port 60 which is centrally formed at first circular plate member 53, and a heat medium outlet port 70 which is formed at a front portion of the outer annular cylindrical member 51. Combustion gas outlet port 80 is formed at the front portion of the inner annular cylindrical member 52, and penetrates through the outer annular cylindrical member 51. Furthermore, the heat medium outlet port 70 and the combustion gas outlet port 80 are angularly offset from each other by about 180° with respect to the longitudinal axis of heat exchanger 50.

Heating apparatus 100 described above is assembled as follows. First, a sub-assembly "B'" is prepared in a separate subassembling line in accordance with the following sequential steps (a')–(g').

(a') First and second cylindrical members 21 and 23 are temporarily assembled to each other by disposing flange portion 23a of second cylindrical member 23 on second annular planar region 21d of first cylindrical member 21 and maintained so that indents 21f of first cylindrical member 21 are received in the corresponding circular holes 23b of flange portion 23a of second cylindrical member 23.

(b') Fuel supply pipe 26 is secured to flange portion 23a of second cylindrical member 23 by caulking and maintained so that nozzle 26a of fuel supply pipe 26 penetrates through second cylindrical member 23, and the coupling element 26a to which one end of the fuel supply pipe 26 is fixedly connected is received within semicircular cut-out portion 21h which is formed at one peripheral portion of the front end of first cylindrical member 21.

(c') Fan motor 30 is firmly secured to first cylindrical member 21 by screws 22 together with second cylindrical member 23.

(d') First fan 33 is firmly secured to the front end portion of drive shaft 32 of fan motor 30.

(e') Cup-shaped member 25 is firmly mounted about the rear end portion of drive shaft 32 of fan motor 30.

(f') Second fan 34 is firmly secured to the rear end of drive shaft 32 of fan motor 30 by bolt 34a.

(g') First cylindrical member 21 is firmly and releasably secured to third cylindrical member 27 by screws 27c. Thus, the sub-assembly "B'" is prepared.

Now, heating apparatus 100 is assembled in accordance with the following sequential steps (1')–(3').

(1') The rear end plate section 212a of second casing portion 212 is firmly and releasably secured to the front end of the inner annular circular member 52 of heat exchanger 50 by screws 58 and maintained while fourth cylindrical member 40 fixedly connected to the rear end plate section 212a of second casing portion 212 and thus is disposed within the inner hollow space of the inner annular cylindrical member 52 of heat exchanger 50, which has been already assembled.

(2') The sub-assembly "B'" is inserted into second casing portion 212 and maintained while the corner 27e of third cylindrical member 27 is fittingly disposed on the inner surface of the corner 212d of second casing portion 212 through annular member 28.

(3') First and second casing portions 211 and 212 are firmly and releasably connected to each other by screws 240 through the corresponding pair of L-shaped plates 241 and 242 so that an outer surface of large diameter region 21a of first cylindrical member 21 is in fitting contact with an inner surface of second casing portion 212, and the coupling element 26b is fittingly received in semicircular opening 211a of first casing portion 211 and semicircular opening 212e of second casing portion 212.

Thus, a process of assembling the heating apparatus 100 is completed.

Furthermore, when first and second casing portions 211 and 212 are firmly and releasably connected to each other, fan motor 30 is arranged, such that a longitudinal axis of drive shaft 32 of fan motor 30 is located on the longitudinal axis of first casing portion 211.

In operation of heating apparatus 100, air is introduced into chamber 250, which is defined by first casing portion 211 and first cylindrical member 21, from outside of casing 210' through circular opening 211c of the front end plate section 211b of first casing portion 211 by virtue of the rotation of first fan 33. The air introduced into the chamber 250 moves to chamber 260, which is defined by second casing portion 212, first cylindrical member 21 and third cylindrical member 27, through a plurality of holes 21i formed at first annular plane region 21c of first cylindrical member 21. The air in chamber 260 further moves to an inner hollow space of third cylindrical member 27 through a plurality of circular holes 27f formed at a side wall of third cylindrical member 27. The air in the inner hollow space of third cylindrical member 27 is consumed for burning the fuel which is conducted into the inner hollow space of third cylindrical member 27 in a manner described below.

A liquid fuel, such as kerosene in the fuel tank (not shown) is pumped up by a fuel pump (not shown), and is conducted to fuel supply pipe 26 via the external fuel supply pipe (not shown) and coupling element 26b. The fuel conducted to fuel supply pipe 26 is ejected from nozzle 26a, and collides with an inner surface of the side wall 25a of cup-shaped member 25 which is rotating together with the drive shaft 32 of fan motor 30. As a result, a film of fuel having an even thin thickness is formed at the inner surface of the side wall 25a of the cup-shaped member 25. Nozzle 26a is arranged, such that the longitudinal axis of nozzle 26a is situated in a first quadrant of axes "X" and "Y" while the rotational direction of drive shaft 32 of fan motor 30 is clockwise as indicated by arrow "A" in FIG. 3. The even thin film of fuel thus is effectively formed at the inner surface of the side wall of the cup-shaped member 25. The thin film of fuel is gradually moved forwardly, and then is separated from the side wall 25a of the cup-shaped member 25 due the centrifugal force acting on the cup-shaped member 25. When the film of fuel is separated from the cup-shaped member 25, the fuel scatters into a large number of small droplets in the hollow space of third cylindrical member 27. The small droplets of the fuel are sufficiently suspended in the air in the inner hollow space of third cylindrical member 27 by virtue of the rotation of second fan 34. Then, the fuel begins to burn in the inner hollow space of third cylindrical member 27 by virtue of operation of an igniter (not shown).

As indicated by single-dot-dash lines in FIG. 1, the combustion gas produced by burning the fuel moves into an inner hollow space of fourth cylindrical member 40. The combustion gas in the inner hollow space of fourth cylindrical member 40 further moves into the axial passages 52b defined between the adjacent projections 52a of the inner annular cylindrical member 52 of heat exchanger 50, and then moves forwardly.

On the other hand, as indicated by double-dot-dash lines in FIG. 1, the heat medium is conducted into cylindrical hollow space 57, which is defined between the first and second circular plate members 53 and 54, through the heat medium inlet port 60, and moves radially outwardly. Then, the heat medium moves into the annular hollow space 56, which is defined by the outer and inner annular cylindrical members 51 and 52 and the annular plate member 55. The heat medium moved into the annular hollow space 56 then moves forwardly, being guided by a helical groove 52d, which is formed at an outer surface of the inner annular cylindrical member 52, so as to conduct the heat medium helically along the outer surface of the inner annular cylindrical member 52.

When the combustion gas moves through the axial passages 52b forwardly while the heat medium moves through the annular hollow space 56 forwardly, a heat exchange is carried out between the combustion gas and the heat medium through the inner annular cylindrical member 52 so as to heat the heat medium. The heated heat medium at a front end portion of the annular hollow space 56 is conducted to an external heating device (not shown) via the heat medium outlet port 70. At the external heating device, heat of the heat medium is radiated to warm a space in which the heating device is disposed. The combustion gas moved to a front end portion of axial passages 52b moves circumferentially, and is conducted to the outside of the heating apparatus 100 via the combustion gas outlet port 80.

In general, soot is formed at an inner peripheral surface of third cylindrical member 27 due to an unexpected abnormal operation of the burning mechanism 220. The formation of deep soot at the inner peripheral surface of third cylindrical member 27 causes an increase in flow resistance of the combustion gas flowing through third cylindrical member 27, so that a performance of the burning mechanism 220 is decreased. As a result, a performance of the heating apparatus 100 functioning as a heat source of an air conditioning system is also decreased.

Therefore, it is required to remove the soot from the inner peripheral surface of third cylindrical member 27 as occasion demands. In order to carry out removal of soot from third cylindrical member 27, the heating apparatus 100 is partially disassembled in a manner described in below.

A process of partially disassembling the heating apparatus 100 is carried out by performing steps (g'), (2') and (3') in the assembling process of the heat exchanger 100 in reverse. That is, the process of partially disassembling the heating apparatus 100 is carried out in accordance with the following sequential steps (101)–(103).

(101) First casing portion 211 is released from second casing portion 212 after taking screws 240 off from the corresponding pair of L-shaped plates 241 and 242.

(102) The sub-assembly "B'" is taken out from the second casing portion 212.

(103) Third cylindrical member 27 is released from first cylindrical member 21 after taking screws 27c off.

After completion of step (103), removal of the soot from the inner peripheral surface of third cylindrical member 27 is easily carried out because the third cylindrical member 27 is handled separately. Simultaneously, the other component parts of the burning mechanism 220, such as second fan 34 can be checked.

After this treatment, the heating apparatus 100 is reassembled by carrying out steps (101)–(103) in the partial disassembling process of the heat exchanger 100 in reverse. That is, the process of reassembling the heating apparatus 100 is carried out in accordance with the following sequential steps (g') (2') and (3').

(g') First cylindrical member 21 is firmly and releasably secured to third cylindrical member 27 by screws 27c.

(2') The sub-assembly "B'" is inserted into second casing portion 212 and maintained while the corner 27e of third cylindrical member 27 is fittingly disposed on the inner surface of the corner 212d of second casing portion 212 through annular member 28.

(3') First and second casing portions 211 and 212 are firmly and releasably connected to each other by screws 240 through the corresponding pair of L-shaped plates 241 and 242 so that the outer surface of large diameter region 21a of first cylindrical member 21 is in fitting contact with the inner surface of second casing portion 212, and the coupling element 26b is fittingly received in semicircular opening 211a of first casing portion 211 and semicircular opening 212e of second casing portion 212.

In the above-mentioned conventional heating apparatus 100, the following disadvantages may occur. First, since casing 210' of burner 200' is formed by two separate portions 211 and 212 having about the same dimensions, strain caused by forces acting on the casing 210' is concentrated upon a location at which the first and second casing portions 211 and 212 are connected to each other. Accordingly, when the heating apparatus 100 is used in a situation where heating apparatus 100 frequently receives periodic vibrations, for example, when the heating apparatus 100 is used for a heat source of an automotive air conditioning system, and is required to be installed in an automobile engine compartment, the frequent periodical vibrations propagating from the automobile engine compartment cause the concentrated strain on the casing 210' at the location at which the first and second casing portions 211 and 212 are connected to each other. Therefore, over the course of time, the connection between the first and second casing portions 211 and 212 may be loosened so that defective gaps may be created between the rear end region of first casing portion 211 and the front end region of second casing portion 212. Accordingly, if fuel defectively leaks from the burning mechanism 220 in an ignition stage, the leaked fuel from the burning mechanism 220 may be further leaked to outside of the heating apparatus 100 through the above-mentioned defective gaps.

Secondly, when the heating apparatus 100 is reassembled after the completion of maintenance of the burning mechanism 220, the nozzle 26a of fuel supply pipe 26 may not be properly rearranged. Specifically, during a process of reassembling the heating apparatus 100, it is required to adjust a circumferential position of first cylindrical member 21 relative to the second casing portion 212. According to this adjustment, a circumferential position of the coupling element 26b, which is received within semicircular cut-out portion 21h of first cylindrical member 21, relative to the semicircular opening 212e of second casing portion 212 is also adjusted. This adjusting manner causes an unnecessary circumferential movement of connecting member 26b together with the other end of fuel supply pipe 26 opposite to nozzle 26a. As a result, when the process of reassembling the heating apparatus 100 is completed, nozzle 26a of the fuel supply pipe 26 may be erroneously situated in a second or fourth quadrant of axes "X" and "Y" while the rotational direction of drive shaft 32 of fan motor 30 is clockwise as indicated by arrow "A" in FIG. 3. This improper situation of nozzle 26a of the fuel supply pipe 26 causes defective film formation of the fuel along the inner surface of the side wall 25a of cup-shaped member 25, such as a formation of the fuel film having uneven thickness. Accordingly, the fuel may not be effectively burnt in the inner hollow space of third cylindrical member 27, so that the performance of the heating apparatus 100 functioning as the heat source of an air conditioning system is decreased.

Lastly, because that the helical groove 52d insufficiently guides the heat medium, the heat medium flows from the heat medium inlet port 60 to the heat medium outlet port 70 via various flow paths having various distances. The distance of the heat medium flow path from the inlet port 60 to the outlet port 70 varies between the maximum and minimum values which are defined below.

The minimum distance of the heat medium flow path is measured when the heat medium flows through cylindrical hollow space 57 upwardly and then flows through the annular hollow space 56 forwardly to the outlet port 70. On the other hand, the maximum distance of the heat medium flow path is measured when the heat medium flows through cylindrical hollow space 57 downwardly and then flows through the annular hollow space 56 forwardly, and finally flows circumferentially around a front end portion of annular hollow space 56 to the outlet port 70.

Accordingly, when the heat medium flows from the inlet port 60 to the outlet port 70, the heat medium flow paths having various flow resistances are created. The minimum flow resistance is generated when the heat medium flows along the path having the minimum distance, and the maximum flow resistance is generated when the heat medium flows along the path having the maximum distance. As a result, when the heat medium flows through cylindrical hollow space 57 and annular hollow space 56, an uneven distribution of flow rate of the heat medium is generated. Therefore, the heat exchange between the heat medium and the combustion gas through the inner annular cylindrical member 52 is not effectively carried out, so that the performance of the heating apparatus 100 functioning as the heat source of the air conditioning system is decreased.

SUMMARY OF THE INVENTION

Accordingly, it is an object of the present invention to provide a heating apparatus in which fuel leakage to an outside of the heating apparatus can be effectively prevented.

It is another object of the present invention to provide a heating apparatus which can effectively perform as a heat source of an air conditioning system.

In order to achieve the above objects, a heating apparatus in accordance with the present invention includes a heat exchanger and a burner. The heat exchanger comprises a first casing having a first end and a second end opposite to the first end, a first fluid path through which a first heat medium flows, a second flow path through which a second heat medium flows, an inlet port for conducting the first heat medium into the first fluid path from outside of the heating apparatus, a first outlet port for conducting the first heat medium to the outside of the heating apparatus from the first fluid path, and a second outlet port for conducting the second heat medium to the outside of the heating apparatus from the second fluid path.

The first fluid path is defined by the first casing and a partition member which is disposed within the first casing. The second fluid path is defined within the first partition member, so that the second fluid path is substantially surrounded by the first fluid path.

The burner comprises a second casing having a first end and a second end, which is opposite to the first end, and faces to the first end of the first casing, a fuel conducting mechanism for conducting a fuel into an inner hollow space of the second casing from the outside of the heating apparatus, a moving mechanism for moving air in the second casing from the first end to the second end, a burning mechanism for burning the fuel so that a combustion gas functioning as the second heat medium is produced, a coupling mechanism for coupling the fuel conducting mechanism, the moving mechanism and the burning mechanism to one another, a combustion gas conducting mechanism for conducting the combustion gas in the second casing to the second fluid path of the heat exchanger.

The second casing is formed by a single integral member, and the second end of the second casing is releasably secured to the first end of the first casing.

DETAILED DESCRIPTION OF THE PREFERRED EMBODIMENTS

Figure 5:
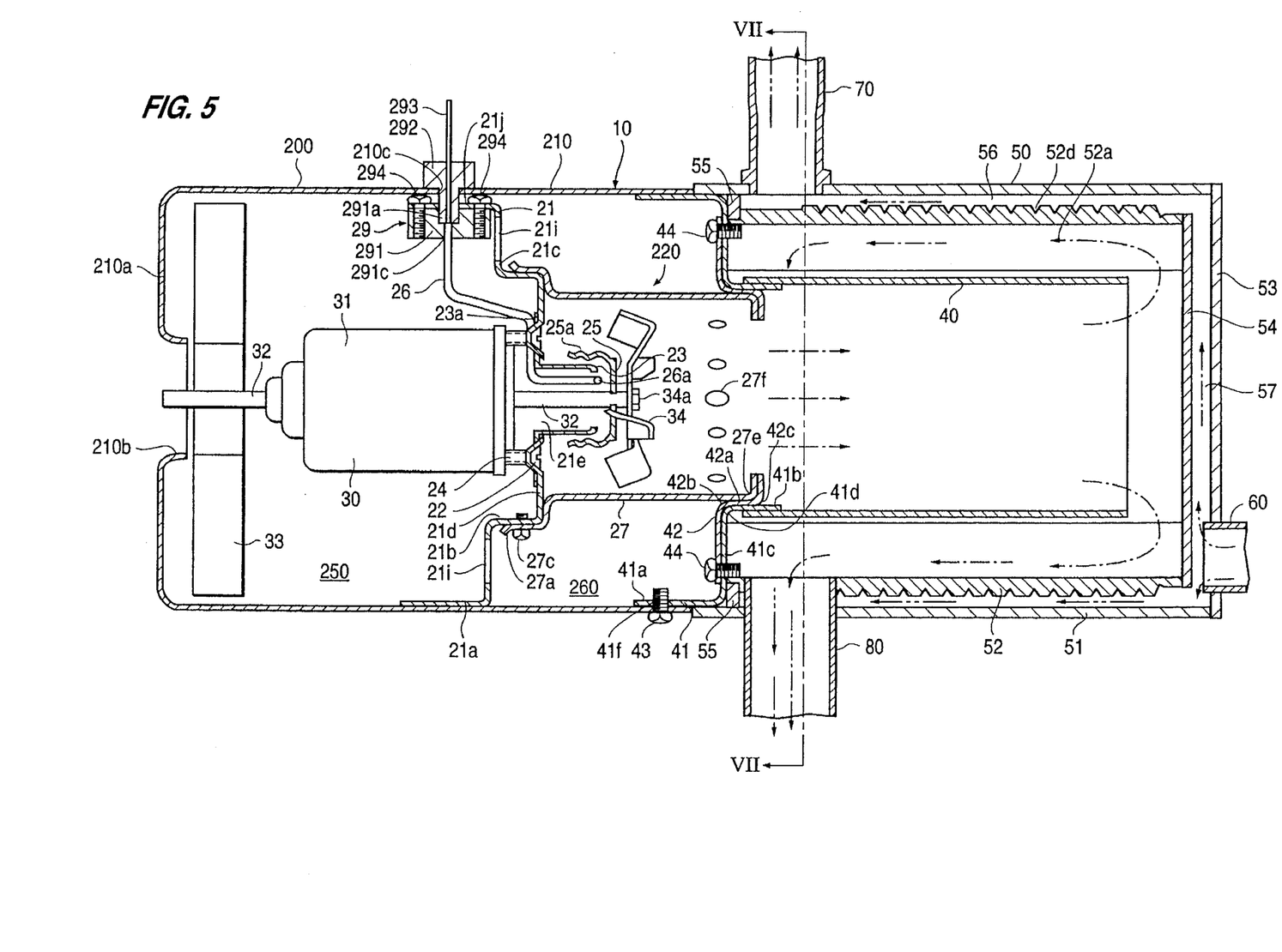
FIG. 5 is a longitudinal cross sectional view of a heating apparatus in accordance with a first embodiment of the present invention.

FIG. 5 illustrates a heating apparatus 10 in accordance with a first embodiment of the present invention. In FIG. 5, for purposes of explanation only, the left side of the figure will be referenced as the forward end or front of heating apparatus 10, and the right side of the figure will be referenced as the rearward end or rear of heating apparatus 10. Furthermore, identical reference numerals are used to denote elements which are identical to the similar numbered elements shown in the prior art FIGS. 1–4 so that an explanation thereof will be substantially omitted.

With reference to FIG. 5, the heating apparatus 10 includes a burner 200 and heat exchanger 50. Burner 200 comprises a burning mechanism 220, a fan motor 30 associated with the burning mechanism 220, and cylindrical casing 210 housing the burning mechanism 220 and the fan motor 30 therein.

Figure 8:
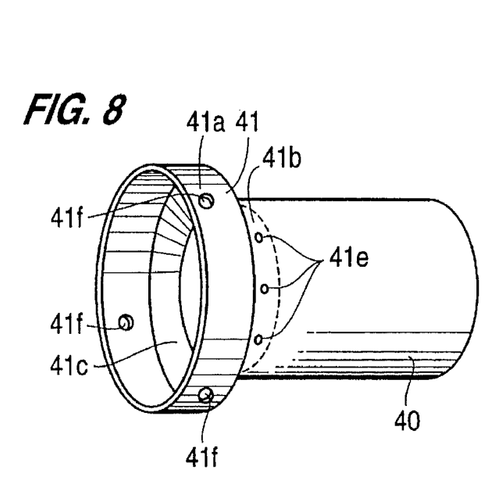
FIG. 8 is a perspective view of an internal component part of the heating apparatus shown in FIG. 5.

First connecting member 41 having a cylindrical shape is disposed in a rear end portion of casing 210. First connecting member 41 includes a larger diameter portion 41a, smaller diameter portion 41b to the rear of lager diameter portion 41a, a planar portion 41c which connects the larger diameter portion 41a to the smaller diameter portion 41b, and a corner 41d which is formed at a time when the smaller diameter portion 41b is formed. The planar portion 41c is arranged to be parallel to a plane perpendicular to the longitudinal axis of first connecting member 41. As illustrated in FIG. 8, the smaller diameter portion 41b of first connecting member 41 is fittingly inserted into a front end portion of fourth cylindrical member 40, and is fixedly connected by, for example, spot welding. Spot welding is carried out uniformly around an annular portion where the front end portion of the fourth cylindrical member 40 overlays with the smaller diameter portion 41b of first connecting member 41. Accordingly, a plurality of welded spots 41e are formed at the above-mentioned annular portion with circumferentially spacing one another with equiintervals.

The larger diameter portion 41a of first connecting member 41 is fittingly inserted into a rear end portion of casing 210, and the first connecting member 41 and casing 210 are firmly and releasably secured to each other at their mating surfaces by, for example, a plurality of, e.g., three screws 43. When the rear end portion of casing 210 is connected to the larger diameter portion 41a of first connecting member 41, a rear end of casing 210 is in contact with a front end of the outer annular cylindrical member 51 of heat exchanger 50. A shaft portion of screws 43 engages with the corresponding female screw threaded holes 41f formed at the larger diameter portion 41a of first connecting member 41. Preferably, holes 41f are circumferentially spaced from one another with equiintervals as illustrated in FIG. 8.

Second connecting member 42 having an annular shape is disposed between third cylindrical member 27 and fourth cylindrical member 40. Second connecting member 42 includes a cylindrical portion 42a, a first corner 42b and a second corner 42c to the rear of first corner 42b. The first and second corners 42b and 42c are formed at a time when the cylindrical portion 42a is formed. The cylindrical portion 42a is arranged, such that the longitudinal axis thereof is located on the longitudinal axis of second connecting member 42. The second corner 42c of second connecting member 42 is fittingly disposed on the outer surface of corner 27e of third cylindrical member 27. Second connecting member 42 and third cylindrical member 27 are fixedly attached to each other at their mating surfaces by, for example, spot welding.

Second connecting member 42 is in fitting contact with a front end surface of the planar portion 41c of first connecting member 41, and the first corner 42b of second connecting member 42 is fittingly disposed on the outer surface of the corner 41d of first connecting member 41. Second connecting member 42 is firmly and releasably secured to a front end of the inner annular cylindrical member 52 of heat exchanger 50 through the first connecting member 41 by, for example, a plurality of, e.g., six screws 44. Furthermore, a shaft portion of screws 44 are screwed into the corresponding female screw portions 52c, which are formed at an inner peripheral surface of the front end of the inner annular circular member 52 as illustrated in FIG. 7. Preferably, female screw portions 52c are circumferentially spaced from one another with equiintervals.

Accordingly, the front end of fourth cylindrical member 40 is firmly and releasably connected to a front end of heat exchanger 50 through first connecting member 41, and the rear end of third cylindrical member 27 is firmly and releasably connected to the front end of the fourth cylindrical member 40 through first and second connecting members 41 and 42.

Casing 210 includes a front end plate portion 210a formed at a front end thereof. The front end plate portion 210a is located at a position adjacent to first fan 33 so as to cover first fan 33. Accordingly, interference between the first fan 33 and an object which may intrude from outside of the heating apparatus 10 is effectively prevented. Circular opening 210b is centrally formed in the front end plate portion 210a of casing 210 so as to provide communication between the outside and the inside of casing 210.

Figure 6:
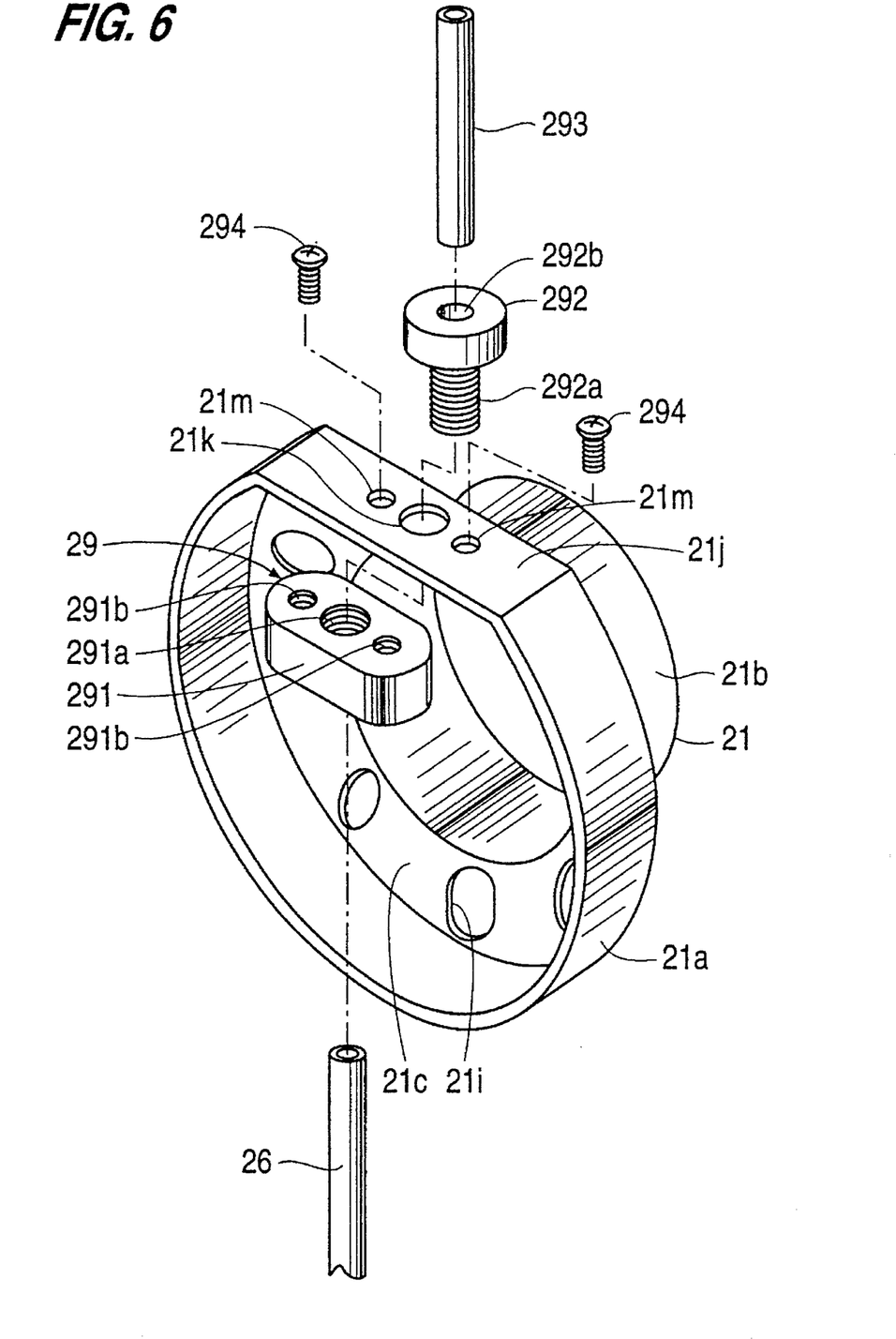
FIG. 6 is an enlarged exploded perspective view of a coupling device of a burner shown in FIG. 5.

First cylindrical member 21 is centrally disposed in casing 210 in a longitudinal direction. As illustrated in FIG. 6, first cylindrical member 21 comprises a flat section 21j formed at an upper peripheral portion of the large diameter region 21a thereof. Coupling device 29 for coupling the fuel supply pipe 26 to an external fuel supply pipe (not shown) is associated with first cylindrical member 21. A manner of coupling the fuel supply pipe 26 to the external fuel supply pipe is described in detail below.

With reference to FIG. 6 in addition to FIG. 5, the coupling device 29 comprises a cylindroidal disk member 291 and a cylindrical member 292. A hole 291a and a pair of holes 291b are axially formed through the disk member 291. The holes 291a and 291b are arranged to be aligned with one other in the direction of the major axis of disk member 291. Hole 291a is located at a central portion of the disk member 291 at a location between holes 291b. A diameter of hole 291a is designed to be greater than a diameter of holes 291b. An inner peripheral surface of each of holes 291a and 291b is threaded to receive a male screw. The pair of holes 291b are prepared for being engaged with a shaft portion of the later-mentioned screws 294. As illustrated in FIG. 5, hole 291a includes a smaller diameter portion 291c which is formed at a lower end of hole 291a so as to receive one end portion of fuel supply pipe 26 opposite to nozzle 26a.

The cylindrical member 292 includes a smaller diameter portion 292a formed at a lower portion thereof. An outer peripheral surface of smaller diameter portion 292a of cylindrical member 292 is threaded to a male screw. A central hole 292b is formed through cylindrical member 292 so as to receive a lower end portion of connecting pipe 293 of which an upper end can be comnected to the external fuel supply pipe (not shown).

A hole 21k and a pair of holes 21m are formed through the flat section 21i of first cylindrical member 21. The holes 21k and 21m are arranged to face and align with holes 291a and 291b of disk member 291, respectively. A diameter of hole 21k is designed to be slightly greater than an outer diameter of the smaller diameter portion 292a of cylindrical member 292. The pair of holes 21m are prepared for receiving the shaft portion of the screws 294.

One end portion of fuel supply pipe 26 opposite to nozzle 26a is fittingly received in the smaller diameter portion 291c of disk member 291, and fuel supply pipe 26 and disk member 291 are fixedly connected to each other by, for example, brazing. An upper end surface of disk member 291 is in contact with a lower end surface of the flat section 21j of first cylindrical member 21, and the disk member 291 and the first cylindrical member 21 are firmly connected to each other at their mating surfaces by, for example, a pair of screws 294. The lower end portion of connecting pipe 293 is fittingly received in an upper portion of the central hole 292b of cylindrical member 292, and the connecting pipe 293 and cylindrical member 292 are fixedly connected to each other by, for example, brazing.

The smaller diameter portion 292a of cylindrical member 292 penetrates through a hole 210c which is formed at a side wall of casing 210 and hole 21k of the flat section 21j of first cylindrical member 21, and engages with hole 291a of disk member 291. As a result, disk member 291 and cylindrical member 292 are firmly and releasably connected to each other, so that fuel supply pipe 26 is linked to the connecting pipe 293 via the central hole 291a of disk member 291 and the central hole 292b of cylindrical member 292. Furthermore, the upper end of the connecting pipe 293 will be connected to one end of the external fuel supply pipe (not shown) through a flexible tube, such as a rubber tube (not shown), when the heating apparatus 10 is installed in a heating system (not shown).

With reference to FIG. 7 in addition to FIG. 5, heat exchanger 50 is provided with a heat medium inlet port 60 which is formed at one peripheral portion of first circular plate member 53, and a heat medium outlet port 70 which is formed at a front portion of the outer annular cylindrical member 51. The heat medium inlet and outlet ports 60 and 70 are angularly offset each other by about 180° with respect to the longitudinal axis of the heat exchanger 50. Combustion gas outlet port 80 is formed at the front portion of the inner annular cylindrical member 52, and penetrates through the outer annular cylindrical member 51. The heat medium outlet port 70 and the combustion gas outlet port 80 are angularly offset each other by about 180° with respect to the longitudinal axis of the heat exchanger 50.

Heating apparatus 10 described above is assembled in accordance with the following sequential steps (1)–(4).

(1) Fourth and third cylindrical members 40 and 27 are firmly connected to the inner annular cylindrical member 52 of heat exchanger 50, which has been already assembled, by screws 44 through first and second connecting members 41 and 42 respctively (2) First cylindrical member 21 is firmly and releasably secured to third cylindrical member 27 by screws 27c such that the large diameter section 27a of third cylindrical member 27 is fittingly disposed on an outer surface of the small diameter region 21b of first cylindrical member 21.

Before performing the above step (2), a sub-assembly "B" has been already prepared in a separate sub-assembling line in accordance with the following sequential steps (a)–(g).

(a) First and second cylindrical members 21 and 23 are temporarily assembled to each other by disposing flange portion 23a of second cylindrical member 23 on second annular planar region 21d of first cylindrical member 21 and maintained in a position where indents 21f of first cylindrical member 21 are received in the corresponding circular holes 23b of flange portion 23a of second cylindrical member 23.

(b) Fuel supply pipe 26 is secured to flange portion 23a of second cylindrical member 23 by caulking so that nozzle 26a of fuel supply pipe 26 penetrates through second cylindrical member 23, and one end portion of fuel supply pipe 26 opposite to nozzle 26a is fixedly received in the smaller diameter portion 291c of hole 291a of disk member 291 by brazing.

(c) Disk member 291 and the first cylindrical member 21 are firmly connected to each other at their mating surfaces by screws 294.

(d) First fan 33 is firmly secured to the front end portion of drive shaft 32 of fan motor 30.

(e) Cup-shaped member 25 is firmly mounted about the rear end portion of drive shaft 32 of fan motor 30.

(f) Second fan 34 is firmly secured to the rear end of drive shaft 32 of fan motor 30 by bolt 34a.

(g) Fan motor 30 is firmly secured to first cylindrical member 21 by screws 22 together with second cylindrical member 23. Thus, the sub-assembly "B" is prepared.

Now, a process of assembling the heating apparatus 10 is continued.

(3) The rear end portion of casing 210 is firmly and releasably connected to the larger diameter portion 41a of first connecting member 41 by screws 43 so that an outer surface of the larger diameter portion 41a of first connecting member 41 is in fitting contact with an inner surface of the rear end portion of casing 210. Alternatively, casing 210 may be firmly and releasably connected to the large diameter region 21a of first cylindrical member 21 at its middle portion by screws (not shown). Furthermore, when step (3) is completed, fan motor 30 is arranged, such that a longitudinal axis of drive shaft 32 of fan motor 30 is located on the longitudinal axis of casing 210.

(4) Disk member 291 and cylindrical member 292 are firmly and releasably connected to each other by means of engaging their female and male screw threads, respectively whereby fuel supply pipe 26 is linked to the connecting pipe 293 via the central hole 291a of disk member 291 and the hole 292b of cylindrical member 292.

Thus, the process of assembling the heating apparatus 10 is completed.

In operation of heating apparatus 10, air is introduced into chamber 250, which is defined by casing 210 and first cylindrical member 21, from outside of casing 210 through circular opening 210b of the front end plate section 210a of casing 210 by virtue of the rotation of first fan 33. The air introduced into chamber 250 moves to chamber 260, which is defined by casing 210, first cylindrical member 21 and third cylindrical member 27, through a plurality of holes 21i formed at first annular planar region 21c of first cylindrical member 21. The air in chamber 260 further moves to an inner hollow space of third cylindrical member 27 through a plurality of circular holes 27f formed through a side wall of third cylindrical member 27. The air in the inner hollow space of third cylindrical member 27 is consumed for burning the fuel which is conducted into the inner hollow space of third cylindrical member 27 in a manner described below.

A liquid fuel, such as kerosene in the fuel tank is pumped up by a fuel pump (not shown), and is conducted to fuel supply pipe 26 via the external fuel supply pipe (not shown) and the coupling device 29. The fuel conducted to fuel supply pipe 26 is ejected from nozzle 26a, and collides with an inner surface of the side wall 25a of cup-shaped member 25 which is rotating together with the drive shaft 32 of fan motor 30. As a result, a film of fuel having an even thin thickness is formed at the inner surface of the side wall 25a of the cup-shaped member 25. The film of fuel is gradually moved forwardly, and then is separated from the side wall 25a of cup-shaped member 25 due the centrifugal force acting on the cup-shaped member 25. When the film of fuel is separated from cup-shaped member 25, the fuel is scattered into a large number of small droplets in the hollow space of third cylindrical member 27. The small droplets of the fuel are sufficiently suspended in the air in the inner hollow space of third cylindrical member 27 by virtue of the rotation of second fan 34. Then, the fuel begins to burn in the inner hollow space of third cylindrical member 27 by virtue of operation of an igniter (not shown).

As indicated by single dot-dash lines in FIG. 5, the combustion gas produced by burning the fuel moves into an inner hollow space of fourth cylindrical member 40. The combustion gas in the inner hollow space of fourth cylindrical member 40 further moves into the axial passages 52b defined between the adjacent projections 52a of the inner annular cylindrical member 52 of heat exchanger 50, and then moves forwardly.

On the other hand, as indicated by double dot-dash lines in FIG. 5, the heat medium is conducted into cylindrical hollow space 57, which is defined between the first and second circular plate members 53 and 54, through the heat medium inlet port 60, and moves radially from the heat medium inlet port 60. Then, the heat medium moves into the annular hollow space 56 which is defined by the outer and inner annular cylindrical members 51 and 52 and the annular plate member 55. The heat medium moved into the annular hollow space 56 moves forwardly, being guided by a helical groove 52d which is formed at an outer surface of the inner annular cylindrical member 52.

When the combustion gas moves through the axial passages 52b forwardly while the heat medium moves through the annular hollow space 56 forwardly, a heat exchange is carried out between the combustion gas and the heat medium through the inner annular cylindrical member 52 so as to heat the heat medium. The heated heat medium at a front end portion of the annular hollow space 56 is conducted to an external heating device (not shown) via the heat medium outlet port 70. At the external heating device, heat of the heat medium is radiated to warm a space in which the heating device is disposed. The combustion gas moved to a front end portion of axial passages 52b moves circumferentially, and is conducted to the outside of the heating apparatus 10 via the combustion gas outlet port 80.

As already discussed in the prior art, in general, soot is formed at an inner peripheral surface of third cylindrical member 27 due to an unexpected abnormal operation of the burning mechanism 220. The formation of deep soot at the inner peripheral surface of third cylindrical member 27 causes an increase in flow resistance of the combustion gas flowing through third cylindrical member 27, so that performance of the burning mechanism 220 is decreased. As a result, performance of the heating apparatus 10, functioning as a heat source of an air conditioning system, is also decreased.

Therefore, it is required to remove the soot from the inner peripheral surface of third cylindrical member 27 as occasion demands. In order to carry out removal of soot from third cylindrical member 27, the heating apparatus 10 is partially disassembled as described in below.

A process of partially disassembling the heating apparatus 10 is carried out by performing steps (2), (3) and (4) in the assembling process of the heat exchanger 10 in reverse. That is, the process of partially disassembling the heating apparatus 10 is carried out in accordance with the following sequential steps (201)–(203).

(201) Disk member 291 and cylindrical member 292 are released from each other by disengaging their female and male screw threads.

(202) Casing 210 is released from first connecting member 41 after taking out screws 43.

(203) Third cylindrical member 27 is released from first cylindrical member 21 after taking out screws 27c.

After completion of step (203), removing of the soot from the inner peripheral surface of third cylindrical member 27 is easily carried out because the third cylindrical member 27 is handled separately. Simultaneously, the other component parts of the burning mechanism 220, such as second fan 34 can be checked.

After this cleaning and checking, the heating apparatus 10 is reassembled by carrying out steps (201)–(203) in the partial disassembling process of the heat exchanger 10 in reverse. That is, the process of reassembling the heating apparatus 10 is carried out in accordance with the following sequential steps (2), (3) and (4).

(2) First cylindrical member 21 is firmly and releasably secured to third cylindrical member 27 by screws 27c with the large diameter section 27a of third cylindrical member 27 fittingly disposed on an outer surface of the small diameter region 21b of first cylindrical member 21.

(3) Then, the rear end portion of casing 210 is firmly and releasably connected to the larger diameter portion 41a of first connecting member 41 by screws 43 so that the outer surface of the large diameter portion 41a of first connecting member 41 is in fitting contact with the inner surface of the rear end portion of casing 210.

(4) Disk member 291 and cylindrical member 292 are firmly and releasably connected to each other by means of engaging their female and male screw threads, whereby fuel supply pipe 26 is linked to the connecting pipe 293 via the central hole 291a of disk member 291 and the hole 292b of cylindrical member 292.

By means of providing heating apparatus 10 in accordance with the first embodiment of the present invention, the disadvantages discussed in the prior art are effectively resolved as described in detail below. First, since casing 210 of burner 200 is formed by a single integral member, even when the heating apparatus 10 is used in a situation where the heating apparatus 10 frequently receives periodic vibrations, strain on the casing is reduced. For example, when the heating apparatus 10 is used as a heat source of an automotive air conditioning system, and thus is required to be installed in an automobile engine compartment, no concentrated strain on the casing 210 is generated by the frequent periodic vibrations propagating from the automobile engine compartment. As a result, no gap or hole is created at any portion of the casing 210. Accordingly, even if fuel is defectively leaked from the burning mechanism 220 in an ignition stage, the leakage of fuel to outside of the heating apparatus 10 can be effectively prevented.

Secondly, when the heating apparatus 10 is reassembled after the completion of maintenance of the burning mechanism 220, such as the removal the soot from third cylindrical member 27, a proper rearrangement of the nozzle 26a of fuel supply pipe 26 can be easily and reliably carried out, because one end of the fuel supply pipe 26 opposite to nozzle 26a is firmly secured at a fixed location with respect to first cylindrical member 21 by screws 294 through disk member 291 of the coupling device 29. As a result, when the process of reassembling the heating apparatus 100 is completed, nozzle 26a of the fuel supply pipe 26 can be situated at a proper position as shown in FIG. 3. Therefore, the film of fuel is effectively formed at the inner surface of the side wall 25a of cup-shaped member 25. That is, the film of fuel having even thin thickness is formed at the inner surface of the side wall 25a of cup-shaped member 25. Accordingly, the fuel can be effectively burnt in the inner hollow space of third cylindrical member 27, so that a decrease in the performance of the heating apparatus 100 functioning as the heat source of the air conditioning system is effectively prevented.

Lastly, even though the helical groove 52d insufficiently guides the heat medium, the heat medium flows from the heat medium inlet port 60 to the heat medium outlet port 70 via various flow paths having generally equal distance. The generally equal distant paths occur because the heat medium inlet port 60 is located at one peripheral portion of first circular plate member 53, and is angularly offset from the heat medium outlet port 70, which is formed at a front portion of the outer annular cylindrical member 51, by 180° with respect to the longitudinal axis of the heat exchanger 50.

The minimum distance of the heat medium flow path is measured when the heat medium flows through cylindrical hollow space 57 upwardly and then flows through the annular hollow space 56 forwardly to outlet port 70. On the other hand, the maximum distance of the heat medium flow path is measured when the heat medium flows through cylindrical hollow space 57 downwardly and then flows through the annular hollow space 56 forwardly, and finally flows circumferentially around a front end portion of annular hollow space 56 to the outlet port 70. The minimum and maximum distances are approximately the same because of the relative locations of the inlet and outlet ports 60 and 70.

Accordingly, when the heat medium flows from the inlet port 60 to the outlet port 70, the heat medium flow paths with generally equal flow resistance are created. As a result, when the heat medium flows through cylindrical hollow space 57 and annular hollow space 56, a generally even distribution of flow rate of the heat medium is generated. Therefore, the heat exchange between the heat medium and the combustion gas through the inner annular cylindrical member 52 is effectively carried out, so that decrease in the performance of the heating apparatus 100 functioning as the heat source of the air conditioning system is effectively prevented.

Figure 9:
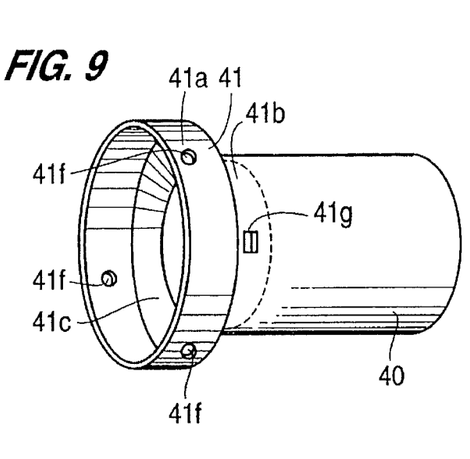
FIG. 9 is a perspective view of an internal component part of a heating apparatus in accordance with a second embodiment of the present invention.
Figure 10:
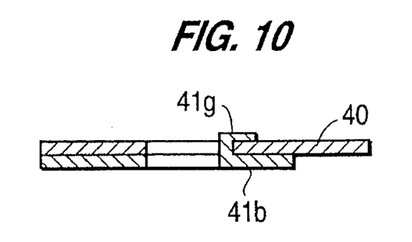
FIG. 10 is an enlarged partial longitudinal cross-sectional view of the internal component part shown in FIG. 9.

FIGS. 9 and 10 illustrate a second embodiment of the present invention. In this embodiment, the smaller diameter portion 41b of first connecting member 41 is fittingly inserted into a front end portion of fourth cylindrical member 40, and is fixedly connected to fourth cylindrical member 40 by caulking as illustrated in FIG. 10. Accordingly, a plurality of caulked portions 41g are formed at an annular portion where the front end portion of the fourth cylindrical member 40 overlays with the smaller diameter portion 41b of first connecting member 41.

Figure 11:
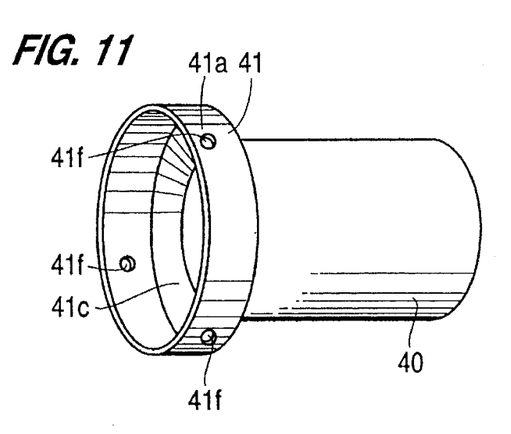
FIG. 11 is a perspective view of an internal component part of a heating apparatus in accordance with a third embodiment of the present invention.

FIG. 11 illustrates a third embodiment of the present invention. In this embodiment, the first connecting member 41 and the fourth cylindrical member 40 are integrally formed by, for example, drawing.

Furthermore, the shape of casing 210 of burner 200 is not limited to cylindrical. The casing 210 may be formed in any other shape in accordance with change in use for the heating apparatus 10. For example, when the heating apparatus 10 is used for a heat source of an automotive air conditioning system, and is required to be installed in an engine compartment of an automobile, the casing 210 can be formed in, for example, a cylindroidal shape so as to be easily installed in a limited space of the automobile engine compartment. In this situation, as a matter of course, heat exchanger 50 which is coupled to the burner 200 can be also formed in a cylindroidal shape.

Still furthermore, the fuel for the heating apparatus 10 is not limited to kerosene. In a situation when the heating apparatus 10 is used for a heat source of an automotive air conditioning system, and the automobile is driven by an internal-combustion engine, the liquid fuel pumped up from an automobile fuel tank is used for the fuel for the heating apparatus 10. Specifically, when the automobile is driven by a diesel engine, light oil is used for the fuel for the heating apparatus 10, and when the automobile is driven by a gasoline engine, the gasoline is used for the fuel for the heating apparatus 10.

Moreover, in the present invention, in order to prevent defective freezing of the heat medium, which flows through the heat exchanger 50 for exchanging heat with the combustion gas, ethylene glycol water solution is employed as the heat medium.

Although several preferred embodiments of the present invention have been described in detail herein, it will be appreciated by those skilled in the art that various modifications may be made without materially departing from the novel and advantageous teachings of the invention. Accordingly, the embodiments disclosed herein are byway of example. It is to be understood that the scope of the invention is not to be limited thereby, but is to be determined by the claims which follow.

We claim:

1. A heating apparatus including a heat exchanger and a burner, said heat exchanger comprising;

a first casing having a first end and a second end opposite to said first end, a first fluid path through which a first heat medium flows, a second fluid path through which a second heat medium flows, an inlet port for conducting said first heat medium into said first fluid path from an outside of said heating apparatus, a first outlet port for conducting said first heat medium to the outside of said heating apparatus from said first fluid path, and a second outlet port for conducting said second heat medium to the outside of said heating apparatus from said second fluid path, said first fluid path being defined by a hollow space formed between said first casing and a first partition member which is disposed within said first casing, said second fluid path being defined within said first partition member, so that said second fluid path is substantially surrounded by said first fluid path, wherein said first fluid path of said first heat medium includes a plurality of flow paths defined within said hollow space and extending between said inlet port and said first outlet port, each said flow path having a substantially equal travel distance and thus a substantially equal flow resistance, said burner comprising;

a second casing having a first end and a second end which is opposite to said first end and faces said first end of said first casing, fuel conducting means for conducting a fuel into an inner hollow space of said second casing from the outside of said heating apparatus, moving means for moving air in said second casing from said first end of said second casing to said second end of said second casing, burning means for burning said fuel so that a combustion gas functioning as said second heat medium is produced, coupling means for coupling said fuel conducting means, said moving means and said burning means to one another, combustion gas conducting means for conducting the combustion gas in said second casing to said second fluid path of said heat exchanger, said second casing being formed by a single integral member, and the second end of said second casing being releasably secured to the first end of said first casting.

2. The heating apparatus of claim 1 wherein said first and second casings are cylindrical in shape.

3. The heating apparatus of claim 2, said coupling means including a first cylindrical member having an annular planar portion formed at one end thereof, said first cylindrical member fittingly disposed within said second casing at a middle portion of said second casing;

said air moving means including a fan motor which comprises a motor housing, a drive shaft connected to said fan motor and having one end extending outwardly toward the first end of said second casing and another end extending toward the second end of said second casing, and a first fan fixedly connected to said one end of said drive shaft, said motor housing being fixedly secured to said annular planar portion of said first cylindrical member;

said fuel conducting means including a pipe member having one end and an other end opposite to said one end, said pipe member fixedly secured to said annular planar portion of said first cylindrical member;

said burning means including a cup-shaped member fixedly mounted about the other end portion of said drive shaft of said fan motor, a second fan fixedly connected to the other end of said drive shaft of said fan motor, and a nozzle formed at said one end of said pipe member by bending a portion of said pipe member in a generally right angle at said one end of said pipe member, said cup-shaped member being slightly broadened toward its opening end, said nozzle being disposed within said cup-shaped member and being adjacent to a bottom end of said cup-shaped member;

said combustion gas conducting means including a second cylindrical member which surrounds said second fan of said fan motor and said cup-shaped member to create a radial air gap, one axial end of said second cylindrical member being releasably secured to said annular plate portion of said first cylindrical member.

4. The heating apparatus of claim 3, said burner further comprising fastening means for fixedly fastening the other end of said pipe member to one peripheral portion Of said first cylindrical member.

5. The heating apparatus of claim 4, said burner still further comprising connecting means for releasably connecting the other end of said pipe member to one end of an external pipe member which conducts the fuel to said pipe member.

6. The heating apparatus of claim 3 wherein said first casing of the heat exchanger is cup-shaped.

7. The heating apparatus of claim 6 wherein said partition member is cup-shaped.

8. The heating apparatus of claim 7 wherein said partition member is arranged such that a generally cylindrical hollow space is created between a bottom end portion of said first casing and a bottom portion of said partition member, and such that a first annular cylindrical hollow space is created between a side wall of said first casing and a side wall of said partition member.

9. The heating apparatus of claim 8 wherein said partition member is further arranged such that the longitudinal axis thereof is located on the longitudinal axis of said first casing.

10. The heating apparatus of claim 8 wherein said first fluid path includes said generally cylindrical hollow space and said first annular cylindrical hollow space.

11. The heating apparatus of claim 9 wherein said heat exchanger further comprises an annular plate member fixedly bridged between an opening end of said first casing and an opening end of said partition member.

12. The heating apparatus of claim 11, said burner further comprising a third cylindrical member which is disposed within said partition member, one axial end of said third cylindrical member being fixedly connected to the opening end of said partition member.

13. The heating apparatus of claim 12 wherein said third cylindrical member is arranged such that a second annular cylindrical hollow space is created between said third cylindrical member and said side wall of said partition member.

14. The heating apparatus of claim 13 wherein said third cylindrical member is further arranged such that the longitudinal axis thereof is located on the longitudinal axis of said first casing.

15. The heating apparatus of claim 13 wherein said second fluid path includes said second annular hollow space.

16. The heating apparatus of claim 14 wherein the other axial end of said second cylindrical member is in fitting contact with one axial end portion of said third cylindrical member.

17. The heating apparatus of claim 16 wherein said second end of said second casing is releasably secured to said opening end of said partition member.

18. The heating apparatus of claim 17 wherein said inlet port is fixedly connected to one peripheral region of the bottom end portion of said first casing.

19. The heating apparatus of claim 18 wherein said first outlet port is fixedly connected to the side wall of said first casing adjacent to said first end of said first casing.

20. The heating apparatus of claim 19 wherein said inlet port and said first outlet port are angularly offset from each other by about 180° with respect to the longitudinal axis of said first casing.

21. The heating apparatus of claim 19 wherein said second outlet port penetrates through the side wall of said first casing, and is fixedly connected to the side wall of said partition member adjacent to said first end of said first casing.

22. The heating apparatus of claim 1 wherein said heating apparatus functions as a heat source of an air conditioning system of an automobile.

23. The heating apparatus of claim 22 wherein said automobile is driven by a diesel engine.

24. The heating apparatus of claim 23 wherein said fuel is a light oil.

25. The heating apparatus of claim 22 wherein said automobile is driven by a gasoline engine.

26. The heating apparatus of claim 25 wherein said fuel is a gasoline.

27. The heating-apparatus of claim 22 wherein said second casing of the burner is cylindroidal in shape.

28. The heating apparatus of claim 27 wherein said first casing of the heat exchanger is cylindroidal in shape.

29. A heating apparatus comprising:

a housing including a heat exchanger casing and a burner casing, said burner casing being formed as a single integral part, and means for releasably connecting facing ends of said casings to one another;

a cup-shaped heat exchanger formed within said heat exchanger casing, said cup-shaped heat exchanger including an exterior cup defined by said heat exchanger casing and in interior cup defined by a partition supported within sand spaced inwardly from said exterior cup;

a first fluid path defined between the interior of said exterior cup and the exterior of said interior cup, and a second fluid path defined within said interior cup;

an inlet port for conducting a first heat medium to be heated into said first fluid path and a first outlet port for conducting the first heat medium from said first fluid path to the exterior of the heating apparatus;

a second outlet port for conducting a second heat medium from said second fluid path to the exterior of the heating apparatus;

a generally ring-shaped coupling device removably supported in said burner casing, said ring-shaped coupling device having a radial outer area and a radial inner area;

a combustion area for burning fuel located adjacent said radial inner area of said ring-shaped coupling device;

an air moving device including a fan motor and at least one fan connected to said coupling device for moving a through said burner casing, past said combustion area in said burner casing and through said second fluid path; and a fuel conducting conduit having a first conduit end and a second conduit end and being connected to said coupling device for conducting fuel from the first conduit end disposed at said radial outer area of said coupling device to the second conduit end disposed at said combustion area at said radially inner area of said coupling device; and a fuel connecting device extending from the exterior of said burner casing to said ting-shaped coupling device for connecting said fuel conducting conduit to a fuel source exterior of the heating apparatus, wherein said fuel connecting device fixedly secures said first conduit end of said fuel conducting conduit with respect to said ring-shaped coupling device such that said second conduit end of said fuel conducting conduit is properly positioned within said combustion area and effective burning of fuel is thereby ensured.

30. The heating apparatus of claim 29 wherein said interior and exterior cups each include a base and a longitudinal wall extending from each respective base along a longitudinal axis, said inlet port being located adjacent the juncture of the base and the longitudinal wall of said exterior cup, and said first outlet port being located about 180° angularly spaced from said inlet port and adjacent an end of said longitudinal wall of said exterior cup spaced from its base.

31. The heating apparatus of claim 30 wherein said base of both said interior cup and said exterior cup is circular and said longitudinal wall of both said interior cup and said exterior cup is cylindrical.

32. The heating apparatus of claim 29 wherein said burner casing has a front end plate portion opposite to its facing end and extends as a single integral part from said facing end to said front end plate, said burner casing surrounding said ring-shaped coupling device, said combustion area and said air moving device, and an air inlet port being formed through said front end plate.

33. The heating apparatus of claim 29 wherein said means for releasably connecting facing ends of said casings includes a bracket disposed within said casings, said bracket having a first portion connected to said heat exchanger casing and a second portion overlaying an interior surface of said burner casing adjacent its facing end, and fasteners extending through said burner casing and removeably attaching said bracket to said burner casing.

34. The heating apparatus of claim 33 wherein said first portion of said bracket extends at a right angle to said second portion of said bracket, and said first portion of said bracket is removably attached to said heat exchanger casing by removable fasteners extending through said first portion of said bracket into a portion of said cup-shaped heat exchanger.

35. The heating apparatus of claim 34 wherein said portion of said cup-shaped heat exchanger includes inward projections of said interior cup, said interior cup being connected to said exterior cup.

36. The heating apparatus of claim 29, including a securement device removably connected to said coupling device for securing a radial outer end of said fuel conducting conduit at a fixed location relative to said coupling device, said securement device including a receptacle for receiving a portion of said fuel connecting device that extends into the interior of said burner casing.

37. The heating apparatus of claim 36 wherein said receptacle of said securement device is a threaded opening and said fuel connecting device having a threaded end for connecting to said threaded opening.

* * * * *